United States Patent
Bordwell et al.

(10) Patent No.: US 9,315,102 B2
(45) Date of Patent: Apr. 19, 2016

(54) POWER TAKE-OFF UNIT (PTO) WITH INTEGRAL SHIFTER

(71) Applicant: Parker-Hannifin Corporation, Cleveland, OH (US)

(72) Inventors: Mark Bordwell, Olive Branch, MS (US); Clive Hindle, Memphis, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/369,849

(22) PCT Filed: Jan. 10, 2013

(86) PCT No.: PCT/US2013/020994
§ 371 (c)(1),
(2) Date: Jun. 30, 2014

(87) PCT Pub. No.: WO2013/106544
PCT Pub. Date: Jul. 18, 2013

(65) Prior Publication Data
US 2015/0000432 A1    Jan. 1, 2015

Related U.S. Application Data

(60) Provisional application No. 61/584,843, filed on Jan. 10, 2012.

(51) Int. Cl.
*B60K 25/06* (2006.01)
*B60K 17/28* (2006.01)

(52) U.S. Cl.
CPC ............... *B60K 25/06* (2013.01); *B60K 17/28* (2013.01)

(58) Field of Classification Search
CPC ................................................ B60K 2025/065
USPC ............................................................ 74/15.86
See application file for complete search history.

(56) References Cited

U.S. PATENT DOCUMENTS

| | | | | |
|---|---|---|---|---|
| 3,540,297 A | * | 11/1970 | Wagner et al. | 74/15.86 |
| 3,709,046 A | | 1/1973 | Mueller | |
| 4,597,301 A | * | 7/1986 | Weis et al. | 74/15.86 |
| 5,070,982 A | * | 12/1991 | Pitchford | 192/69.9 |
| 6,497,313 B1 | * | 12/2002 | Blalock | 192/18 A |

(Continued)

FOREIGN PATENT DOCUMENTS

| | | |
|---|---|---|
| EP | 0452015 | 10/1991 |
| EP | 0666193 | 8/1995 |

OTHER PUBLICATIONS

International Search Report and Written Opinion for corresponding Patent Application No. PCT/US2013/020994 dated Apr. 17, 2013.

*Primary Examiner* — Nicole Verley
(74) *Attorney, Agent, or Firm* — Renner, Otto, Boisselle & Sklar, LLP (57) ABSTRACT

Provided is a power transfer unit, such as a power take-off unit including an input shaft coupled to an input gear for common rotation and axially movable relative to the input gear for engaging a coupling at a first end of the shaft with a drive component, a chamber formed between the input shaft and input gear, and a piston axially movable in the chamber, whereby the piston rotates with the input shaft. Due to the rotation of the piston with the input shaft, a power take-off unit is provided without the need for components to separate the piston from the input shaft.

20 Claims, 5 Drawing Sheets

(56) References Cited

U.S. PATENT DOCUMENTS

| | | |
|---|---|---|
| 7,621,353 B2 * | 11/2009 | Ishii et al. .................... 180/6.2 |
| 7,861,612 B2 | 1/2011 | Jeng et al. |
| 8,997,914 B2 * | 4/2015 | Umemoto et al. ............ 180/308 |
| 9,045,040 B2 * | 6/2015 | Mayer |
| 2008/0264188 A1 | 10/2008 | Graves |
| 2014/0102228 A1 * | 4/2014 | Mayer ........................ 74/15.82 |

* cited by examiner

POWER TAKE-OFF UNIT (PTO) WITH INTEGRAL SHIFTER

RELATED APPLICATIONS

This application is a national phase of International Application No. PCT/US2013/020994filed on Jan. 10, 2013and published in the English language, which claims the benefit of U.S. Provisional Application No. 61/584,843filed Jan. 10, 2012, which is hereby incorporated herein by reference.

FIELD OF INVENTION

The present invention relates generally to power take-off units, and more particularly to power take-off units having input shafts that are engageable to and disengageable from drive components.

BACKGROUND

Power take-off units are mechanical devices that are used in conjunction with sources of rotational energy, such as vehicle engines and transmissions, for selectively providing power to one or more rotatably driven accessories. For example, power take-off units are commonly used in a variety of industrial and agricultural vehicles for operating hydraulic pumps that, in turn, operate hydraulically driven accessories, such as plows, trash compactors, lifting mechanisms, winches, and the like.

SUMMARY OF INVENTION

The present invention provides a power transfer unit, such as a power take-off unit including an input shaft coupled to an input gear for common rotation and axially movable relative to the input gear for engaging a coupling at a first end of the shaft with a drive component, a chamber formed between the input shaft and input gear, and a piston axially movable in the chamber, whereby the piston rotates with the input shaft. Due to the rotation of the piston with the input shaft, a power take-off unit is provided without the need for components to separate the piston from the input shaft.

According to one aspect of the invention, a power transfer unit is provided that includes a housing, an input gear rotationally supported in the housing, an input shaft coupled to the input gear for common rotation, the input shaft being axially movable relative to the input gear for engaging a coupling at a first end of the shaft with a drive component, a chamber formed between the input shaft and input gear, and a piston axially movable in the chamber and sealed to the input shaft and input gear, whereby the piston rotates with the input shaft.

The input shaft is movable from a first position where the input shaft is disengaged from the drive component to a second position where the input shaft is engaged with the drive component.

The input shaft is biased toward the first position by a spring.

The piston is pneumatically moved against the spring force to move the input shaft to the second position.

The power transfer unit further comprising a stop tube surrounding a portion of the input shaft, wherein one end of the spring is seated on the stop tube and another end is seated on the piston.

The piston includes an inner seal that seals to an outer surface of the input shaft and an outer seal that seals to an inner surface of the input gear.

The power transfer unit further comprising a retainer ring, wherein the piston is retained between the retainer ring and a ledge on the input shaft.

The power transfer unit further comprising a chamber defined between a backside of the piston and the housing, wherein the chamber is sealed to the input gear by a seal.

The power transfer unit further comprising a pressure port coupleable to a source of pressurized fluid, wherein pressurized fluid is configured to enter the chamber between the backside of the piston and the housing to axially move the piston and input shaft.

The power transfer unit further comprising an indicator switch configured to indicate a position of the input shaft.

The indicator switch includes an indicator piston biased against a spring by the input shaft, wherein the indicator piston has an end that abuts a second end of the input shaft when the input shaft is disengaged from the drive component.

The indicator piston is sealed to the housing by a seal.

The input shaft includes a relief oil path for allowing oil in the chamber to flow out of the chamber.

The input gear is rotationally supported in the housing by bearings.

The power transfer unit further comprising an output gear rotationally supported in the housing and coupled to the input gear for common rotation.

The output gear is rotationally supported in the housing by bearings.

The power transfer unit in combination with the drive component, wherein rotation of the drive component causes rotation of the input shaft and input gear.

The power transfer unit and drive component in combination with a driven component, wherein the output shaft has a coupling that engages the drive component to cause an input shaft of the driven component to rotate.

According to another aspect of the invention, a power transfer unit is provided that includes a housing, an input gear rotationally supported in the housing, an input shaft coupled to the input gear for common rotation, the input shaft having a coupling at a first end of the shaft configured to engage a driven component, and a piston rotatable with the input shaft, wherein the input shaft and piston are axially movable relative to the input gear.

According to still another aspect of the invention, a method of coupling an input shaft of a power take-off unit to a drive component is provided, the power take-off unit including a housing, an input gear rotationally supported in the housing, the input shaft coupled to the input gear for common rotation, and a piston rotatable with the input shaft. The method includes injecting pressurized fluid into a sealed chamber defined between the backside of the piston and the housing, moving the input shaft and piston via the pressure from a first position where the input shaft is disengaged from the drive component to a second position, and engaging a coupling on the input shaft with a coupling of the drive component.

The foregoing and other features of the invention are hereinafter described in greater detail with reference to the accompanying drawings.

DETAILED DESCRIPTION

The principles of the present application have particular application to power take-off units for use with vehicles, and thus will be described below chiefly in this context. It will of course be appreciated, and also understood, that the principles of the invention may be useful in other power transfer applications where it is desirable to selectively provide power to one or more rotatably driven accessories.

Figure 1:
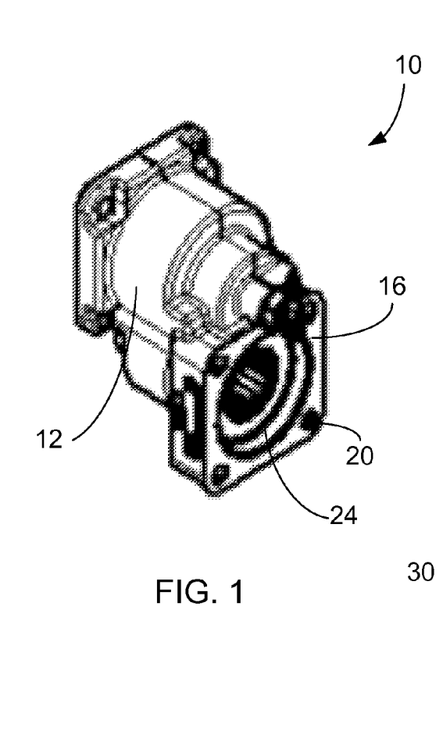
FIG. 1 is a perspective view of an exemplary power take-off unit according to the invention.
Figure 2:
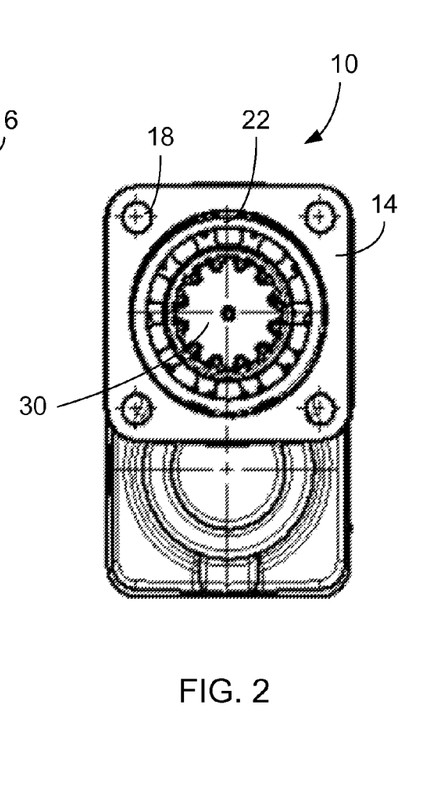
FIG. 2 is a front view of an input section of the power take-off unit of FIG. 1.
Figure 3:
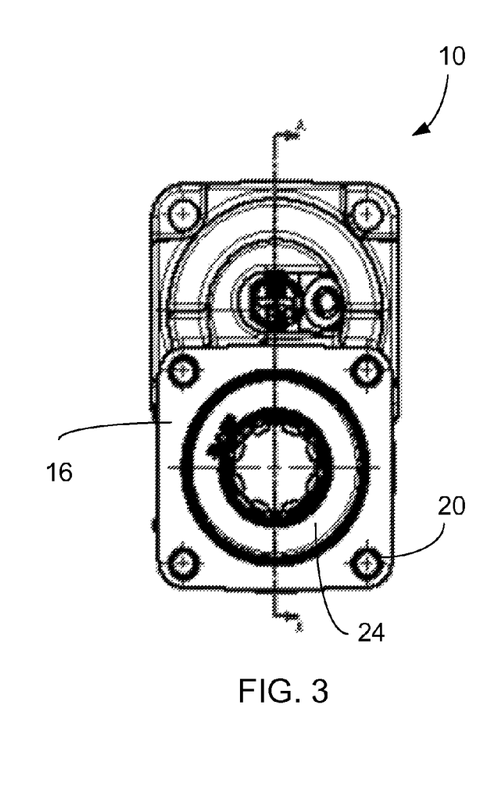
FIG. 3 is a front view an output section of the power take-off unit of FIG. 1.

Turning now to FIGS. 1-3, an exemplary power take-off unit is illustrated generally at reference numeral 10. The power take-off unit 10, which may be a rear mounted configuration, has a hollow housing 12 having a first mounting face 14 and a second mounting face 16. The first mounting face 14 includes a plurality of mounting holes 18 for mounting to a drive component such as a prime mover or transmission, and the second mounting face 16 includes a plurality of mounting holes 20 for mounting to a driven component such as a pump. Each mounting face 14, 16 includes an opening 22, 24, respectively, through which a shaft extends. The opening 22 is provided for an input shaft 30 of the power take-off unit 10 to extend through and the opening 24 is provided for a shaft of a pump to extend through.

Figure 4:
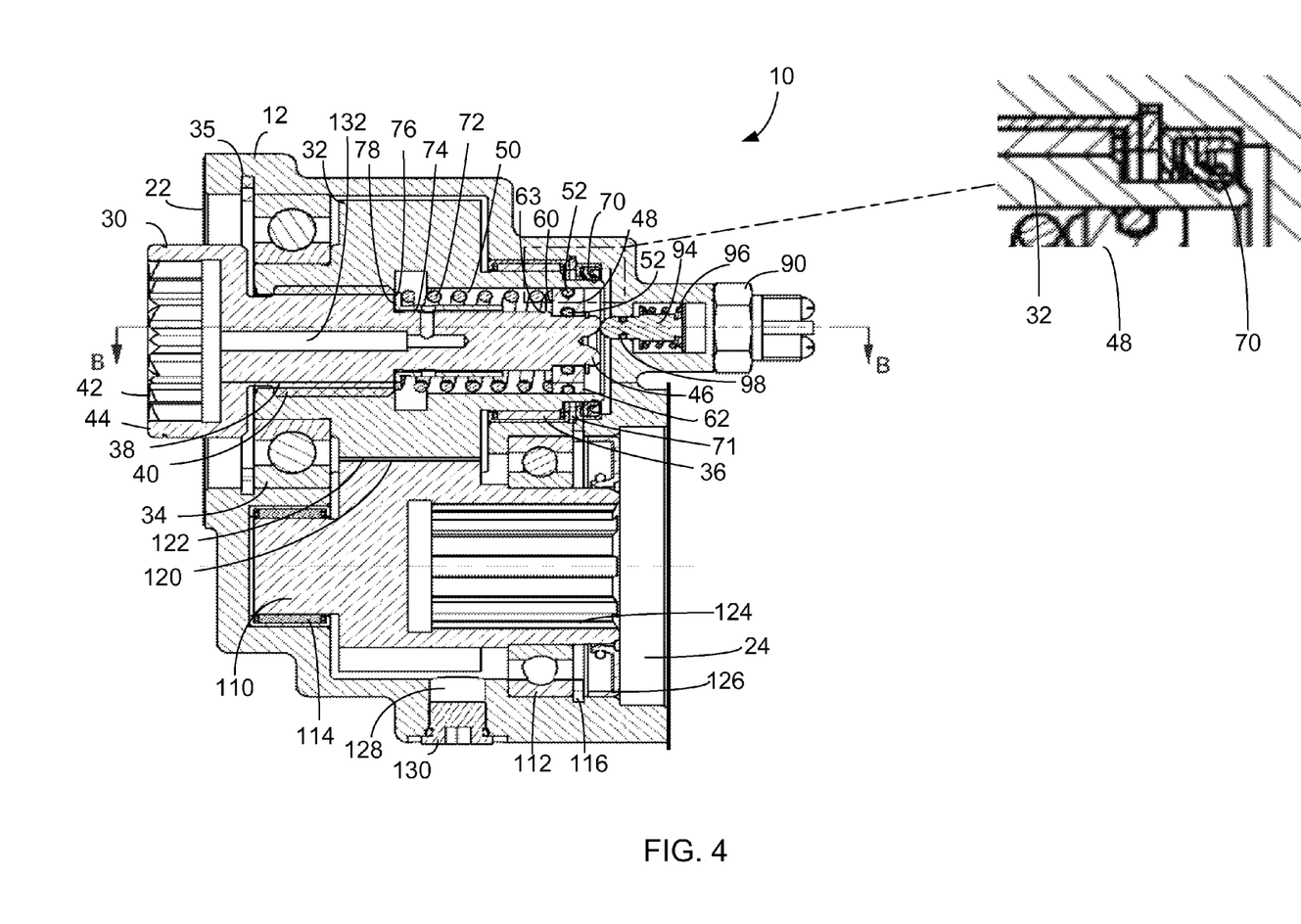
FIG. 4 is a cross-sectional view of the power take-off unit taken about line A-A in FIG. 3.

Turning now to FIG. 4, the input shaft 30 is at least partially surrounded by an input gear 32, which is rotationally supported in the housing in any suitable manner, such as by bearings 34 and 36. The bearings may be any suitable bearings, such as roller bearings, needle bearings, etc. The bearing 34 may be retained in the housing in any suitable, such as by retainer rings 35, and the bearing 36 may be retained in the housing in any suitable manner, for example by a press fit. The input gear 32 is disposed in the hollow housing 12 and the input shaft 30 is partially disposed in the housing.

The input shaft 30 and input gear 32 are coupled for common rotation, for example by splines 38 on an outer circumferential surface of the input shaft 30 that mesh with splines 40 on an inner circumferential surface of the input gear 32. The input shaft 30 is axially movable relative to the input gear 32 for engaging a coupling 42 at a first end 44 of the input shaft 30, which extends through the opening 22 in the housing 12, with a corresponding coupling on a drive component. The couplings may engage in any suitable manner, for example by splines, keys, etc.

Surrounding a second end 46 of the input shaft 30 and supported thereby is a piston, such as an annular piston 48. The piston rotates with the input shaft 30 and is axially movable in a chamber 50 formed between the input shaft 30 and the input gear 32. The piston is sealed to the input shaft and the input gear in any suitable manner, for example by o-ring 52 disposed in a seal groove on an inner circumferential surface of the piston that seals to the input shaft 30, and by o-ring 54 disposed in a seal groove on an outer circumferential surface of the piston that seals to the input gear 32.

The annular piston 48 may be retained on the input shaft 30 at the second end 46 in any suitable manner, such as by a retainer ring 64. As shown, the annular piston 48 includes a front side 60 and a backside 62. The front side 60 abuts a ledge 63 on the input shaft 30 formed by a change in diameter of the input shaft 30, and the backside 62 abuts a retainer ring 64 coupled to the second end 46 of the input shaft 30. In this way, the annular piston 48 is retained between the ledge 63 and the retainer ring 64 so that axial movement of the annular piston 48 effects axial movement of the input shaft 30 and rotation of the input shaft 30 effects rotation of the annular piston 48.

Figure 5:
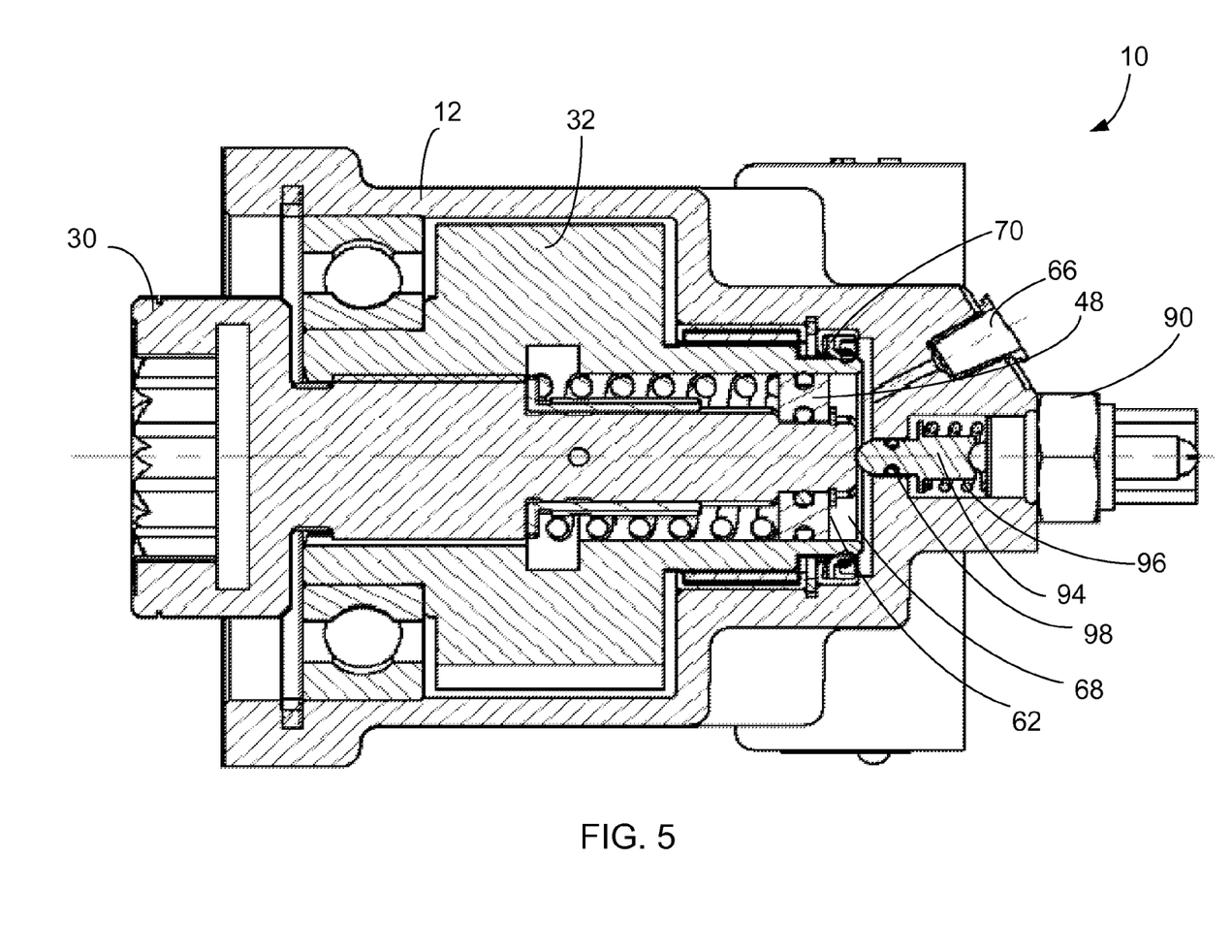
FIG. 5 is a cross-sectional view of the power take-off unit shown in a first position taken about line B-B in FIG. 4.

Referring now to FIG. 5, the power take-off unit 10 also includes a pressure port 66 coupleable to a source of pressurized fluid in any suitable manner. Pressurized fluid enters the housing 12 through the pressure port 66 and flows into a chamber 68 defined between the backside 62 of the annular piston 48 and an inner wall of the housing 12. The chamber 68 is sealed to the input gear 32 and housing 12 by a suitable seal, such as a rotational shaft seal 70. The rotational shaft seal 70, which is more tolerant to wear than an o-ring for example, prevents pressurized fluid in the chamber 68 from escaping to allow the piston 48 to be moved axially by the pressurized fluid without pressure loss around the input gear 32. The rotational shaft seal 70 is retained from movement in the housing while the chamber 68 is pressurized in any suitable manner, such as by a retainer ring 71.

Figure 6:
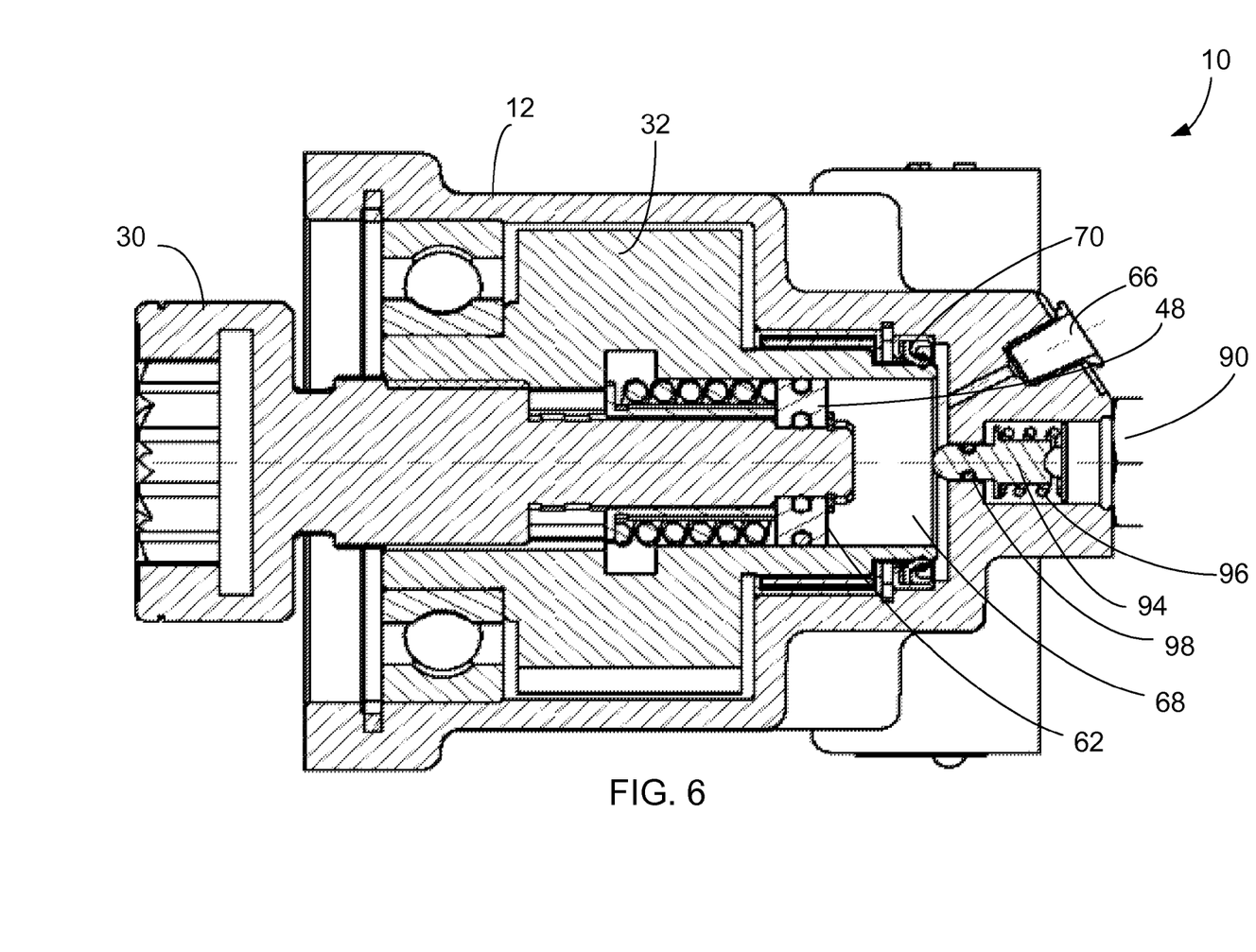
FIG. 6 is a cross-sectional view of the power take-off unit shown in a second position taken about line B-B in FIG. 4.

The pressurized fluid in the chamber 68 forces the piston 48 and the input shaft 30 to move axially from a first position shown in FIG. 5 where the input shaft 30 is disengaged from the drive component to a second position shown in FIG. 6 where the input shaft 30 is engaged with the drive component. The piston 48 and input shaft 30 are moved pneumatically against a force of a spring 72, which biases the input shaft 30 in the first position. The spring 72 has a first end seated against a stop tube 74 and a second end seated against the front side 60 of the piston 48. The stop tube 74 surrounds the input shaft 30 and includes a radially extending flange 76 that serves as a spring seat for the first end of the spring 72. The stop tube is held against a ledge 78 on the input shaft 30 by the spring force. The ledge 78 is formed by a change in diameter of the input shaft 30.

The power take-off unit 10 also includes an indicator switch 90 configured to indicate the position of the input shaft 30. For example, when the input shaft 30 is in the first position disengaged from the drive component, a light coupled to the indicator switch 90 is off, and when the input shaft 30 is in the second position engaged with the drive component, the light is on. Alternatively, the light may be on in the first position, may flash in the first or second position, may be different colors such as red in the first position and green in the second position, etc.

The indicator switch 90 abuts an indicator piston 94 having an opposite end that abuts the second end 46 of the input shaft 30 when the input shaft is in the first position. The indicator piston 94 is biased in a first position against a spring 96 by the input shaft 30 when the input shaft is in the first position, at which point contacts on the indicator switch are open. When the input shaft 30 moves to the second position, the spring 96 moves the indicator piston 94 to a second position and contacts on the indicator switch close. To prevent pressurized fluid in the chamber 68 from flowing towards the indicator switch, a suitable seal, such as o-ring 98 is provided that surrounds an end of the indicator piston 94 and seals the piston and the housing 12.

Referring again to FIG. 4, also disposed in the housing 12 is an output gear 110. The output gear 110 is rotationally supported in the housing in any suitable manner, such as by bearings 112 and 114. The bearings may be any suitable bearings, such as roller bearings, needle bearings, etc. The bearing 112 may be retained in the housing in any suitable, such as by a retainer ring 116, and the bearing 114 may be retained in the housing in any suitable manner, for example by a press fit.

The output gear 110 and input gear 32 are coupled for common rotation, for example by teeth 120 on an outer circumferential surface of the output gear 110 that mesh with teeth 122 on an outer circumferential surface of the input gear 32. The output gear 110 includes a coupling 124 at an end of the output gear 110 adjacent the opening 24 in the housing 12. The coupling 124 is configured to engage a coupling on a driven component that extends into the housing 12 through the opening 24. The couplings may engage in any suitable manner, for example by splines. The coupling 124, mounting face 16 and mounting holes 20 may be modified to couple to a suitable driven component.

To lubricate the coupling 124 to prevent damage, oil from the drive component may work its way through the housing to the coupling 124. If it is desired to have the oil from the drive component remain in the power take-off unit, the output gear 110 is sealed to the housing by a suitable seal, such as rotational shaft seal 126. Similar to the rotational shaft seal 70, the rotational shaft seal 126 is more tolerant to wear than an o-ring. To allow the oil in the housing 12 to be drained from the power take-off unit 10, an opening 128 is provided in the housing below the output gear 110. The opening may be plugged when desired by a suitable plug, such as plug 130 that is threaded in the opening. To allow oil in the chamber 50 to flow out of the chamber and towards the driven component, the input shaft 30 includes a relief oil path 132.

Figure 7:
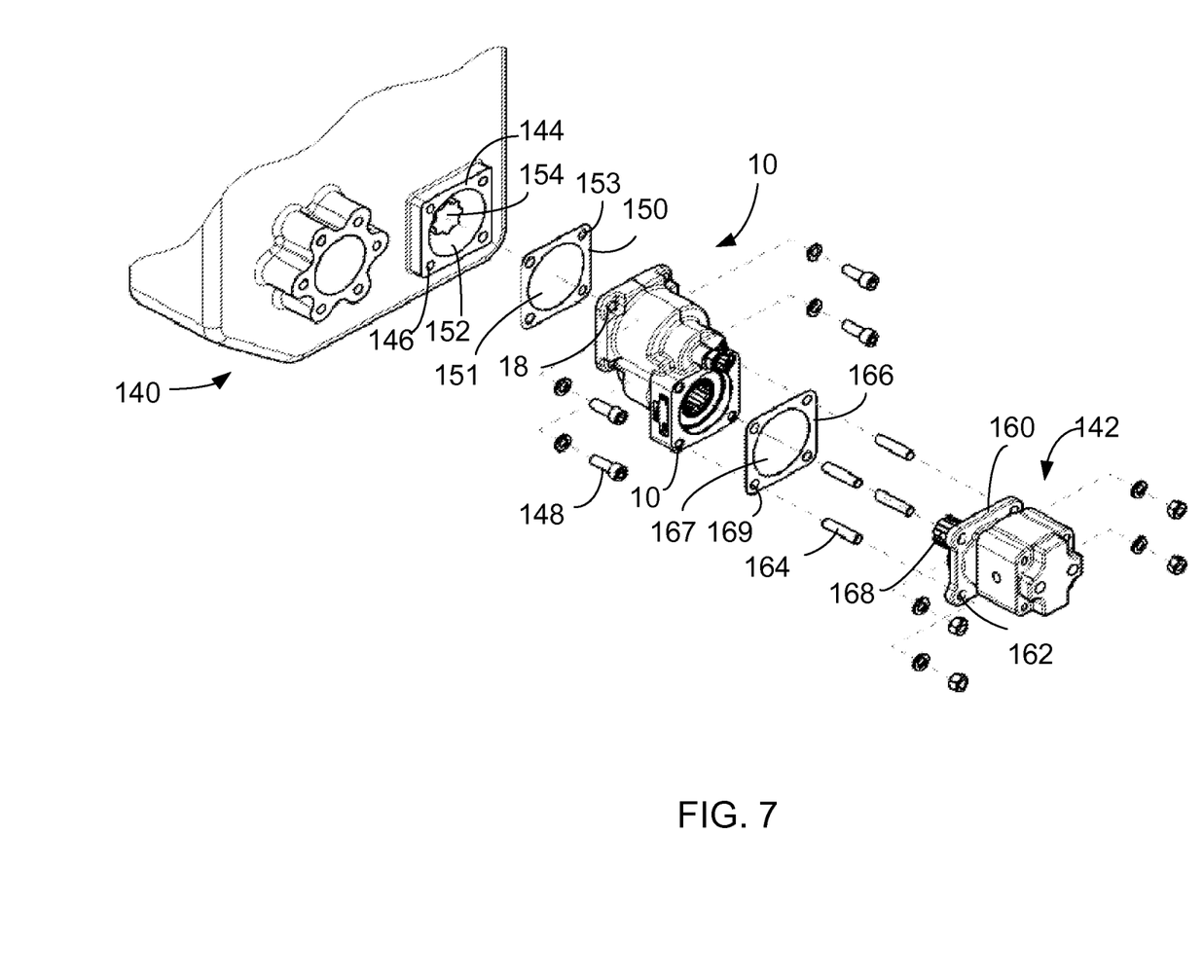
FIG. 7 is an exploded view of the power take-off unit of FIG. 1, a drive component and a driven component.

Turning now to FIG. 7, the power take-off unit 10 is shown in combination with a drive component 140 and a driven component 142. The drive component 140 includes a mounting face 144 that has a plurality of mounting holes 146. The first mounting face 14 of the housing 12 is configured to be coupled to the mounting face 144 of the drive component 140 in any suitable manner, for example by a plurality of bolts 148 that extend through the mounting holes 18 in the first mounting face 14 and the mounting holes 146 in the mounting face 144. A gasket 150 having an opening 151 corresponding to the opening 22 and a plurality of openings 153 corresponding to the mounting holes 18 and 148 may be provided between the mounting faces 14 and 144 to prevent oil leakage between the drive component and the power take-off unit 10. When the power take-off unit 10 and the drive component 140 are coupled together, the coupling 42 at the first end 44 of the input shaft 30 is disposed in a cavity 152 of the drive component 140. When the input shaft 30 is in the disengaged position, the coupling 42 is disengaged from a coupling 154 of the drive component 140 in the cavity 152.

The driven component 142 similarly includes a mounting face 160 having a plurality of mounting holes 162. The second mounting face 16 of the housing 12 is configured to be coupled to the mounting face 160 of the driven component 142 in any suitable manner, for example by a plurality of bolts 164 that extend through the mounting holes 20 in the second mounting face 16 and the mounting holes 162 in the mounting face 160. A gasket 166 having an opening 167 corresponding to the opening 24 and a plurality of openings 169 corresponding to the mounting holes 20 and 162 may be provided between the mounting faces 16 and 160 to prevent oil leakage between the driven component and the power take-off unit 10. When the power take-off unit 10 and the driven component are coupled together, a coupling 168, such as an input shaft of the driven component, extends through the opening 24 in the mounting face 16 and engages the coupling 124 of the output gear 110 to couple the output gear and coupling 168 for common rotation.

When the input shaft 30 is in the disengaged position shown in FIG. 4, rotation of the drive component 140 does not cause rotation of the input shaft 30 and therefore the driven component 142, which is engaged with the power take-off unit 10, is not driven. To cause the driven component 142 to be driven, pressurized fluid, such as compressed air, is injected into the chamber 68 defined between the backside 62 of the piston 48 and the housing 12. The pressurized fluid in the chamber 68 forces the piston 48 to move axially in the chamber 50 against the force of the spring 72. The movement of the piston causes the input shaft 30 to move axially from the first position where the input shaft is disengaged from the drive component 140 to the second position. As the piston 48 and input shaft 30 move axially, the indicator piston 94 is moved axially by the force of the spring 96, which causes the contacts on the indicator switch close. As the input shaft moves to the engaged position, the stroke of the piston and input shaft may be limited by the stop tube. The length of the stop tube may be adjusted to adjust the stroke of the piston and input shaft.

When the input shaft 30 is in the engaged position shown in FIG. 6, the coupling 42 of the input shaft 30 engages the coupling 154 of the drive component 140. Once the input shaft 30 and drive component 140 are engaged, movement of the drive component causes the input shaft 30 to rotate, thereby causing the input gear 32, which is rotationally coupled to the input shaft 30, to rotate. The rotation of the input gear 32 then effects rotation of the output gear 110, which is rotationally coupled to the input gear 32. The rotation of the output gear 110 then effects rotation of the coupling 168, which is engaged with the coupling 124 of the output gear 110. Due to the rotation of the piston 48 with the input shaft 30, a power take-off unit is provided without the need for components, such as a thrust bearing, to separate the piston 48 from the input shaft 30. The power take-off unit thereby reduces the number of parts used to effect engagement of the input shaft 30 and drive component 140.

When it is desired to stop powering the driven component 142, the fluid pressure in the chamber 68 is released. As the fluid pressure releases, the spring 72 causes the input shaft 30 and the piston 48 to retract to the disengaged position towards the indicator switch 90, thereby disengaging the input shaft 30 from the drive component 140. As the input shaft 30 retracts, the first end 46 of the input shaft contacts the indicator piston 94 and axially moves the indicator piston against the force of the spring 96 towards the indicator switch 90. As the indicator piston 94 retracts, the contacts on the indicator switch open. Once in the disengaged position, rotation of the drive component 140 does not cause rotation of the input shaft 30, and therefore the output shaft 110 does not effect rotation of the driven component 142.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A power transfer unit including:
   a housing;
   an input gear rotationally supported in the housing;
   an input shaft coupled to the input gear for common rotation, the input shaft being axially movable relative to the input gear for engaging a coupling at a first end of the shaft with a drive component; and
   a piston axially movable within the input gear and sealed to the input shaft and an inner surface of the input gear, whereby the piston rotates with the input shaft.

2. The power transfer unit according to claim 1, wherein the input shaft is movable from a first position where the input shaft is disengaged from the drive component to a second position where the input shaft is engaged with the drive component.

3. The power transfer unit according to claim 2, wherein the input shaft is biased toward the first position by a spring.

4. The power transfer unit according to claim 3, wherein the piston is pneumatically moved against the spring force to move the input shaft to the second position.

5. The power transfer unit according to claim 3, further comprising a stop tube surrounding a portion of the input shaft, wherein one end of the spring is seated on the stop tube and another end is seated on the piston.

6. The power transfer unit according to claim 1, wherein the piston includes an inner seal that seals to an outer surface of the input shaft and an outer seal that seals to the inner surface of the input gear.

7. The power transfer unit according to claim 1, further comprising a retainer ring, wherein the piston is retained between the retainer ring and a ledge on the input shaft.

8. The power transfer unit according to claim 1, further comprising a chamber defined between a backside of the piston and the housing, wherein the chamber is sealed to the input gear by a seal.

9. The power transfer unit according to claim 8, further comprising a pressure port coupleable to a source of pressurized fluid, wherein pressurized fluid is configured to enter the chamber between the backside of the piston and the housing to axially move the piston and input shaft.

10. The power transfer unit according to claim 1, further comprising an indicator switch configured to indicate a position of the input shaft.

11. The power transfer unit according to claim 10, wherein the indicator switch includes an indicator piston biased against a spring by the input shaft, wherein the indicator piston has an end that abuts a second end of the input shaft when the input shaft is disengaged from the drive component.

12. The power transfer unit according to claim 10, wherein the indicator piston is sealed to the housing by a seal.

13. The power transfer unit according to claim 1, wherein the input shaft includes a relief oil path for allowing oil in a chamber formed between the input shaft and the output gear to flow out of the chamber.

14. The power transfer unit according to claim 1, wherein the input gear is rotationally supported in the housing by bearings.

15. The power transfer unit according to claim 1, further comprising an output gear rotationally supported in the housing and coupled to the input gear for common rotation.

16. The power transfer unit according to claim 15, wherein the output gear is rotationally supported in the housing by bearings.

17. The power transfer unit according to claim 15 in combination with the drive component, wherein rotation of the drive component causes rotation of the input shaft and input gear.

18. The combination according to claim 17 in combination with a driven component, wherein the input shaft has a coupling that engages the drive component to cause an input shaft of the driven component to rotate.

19. A power transfer unit including:
    a housing;
    an input gear rotationally supported in the housing;
    an input shaft coupled to the input gear for common rotation, the input shaft having a coupling at a first end of the shaft configured to engage a driven component; and
    a piston rotatable with the input shaft;
    wherein the input shaft and piston are axially movable relative to the input gear, and wherein the input gear has a piston chamber which rotates with the input gear and in which the piston is axially moveable.

20. A method of coupling an input shaft of a power take-off unit to a drive component, the power take-off unit including a housing, an input gear rotationally supported in the housing, the input shaft coupled to the input gear for common rotation, and a piston rotatable with the input shaft and sealed to the input shaft and an inner surface of the input gear, the method including:
    injecting pressurized fluid into a sealed chamber defined between the backside of the piston and the housing;
    moving the input shaft and piston axially relative to the input gear via the pressure from a first position where the input shaft is disengaged from the drive component to a second position, wherein the piston is axially moved within the input gear; and
    engaging a coupling on the input shaft with a coupling of the drive component.

* * * * *